United States Patent [19]

Abdou-Sabet et al.

[11] Patent Number: 4,594,390

[45] Date of Patent: Jun. 10, 1986

[54] PROCESS FOR THE PREPARATION OF THERMOPLASTIC ELASTOMERS

[75] Inventors: Sabet Abdou-Sabet; Kuo-Shein Shen, both of Akron, Ohio

[73] Assignee: Monsanto Company, St. Louis, Mo.

[21] Appl. No.: 410,196

[22] Filed: Aug. 23, 1982

[51] Int. Cl.[4] ................................................ C08L 9/00
[52] U.S. Cl. .................................. 525/232; 525/133; 525/141; 525/198; 525/240; 525/271
[58] Field of Search ............... 525/133, 141, 198, 271, 525/232, 240

[56] References Cited

U.S. PATENT DOCUMENTS

| | | | |
|---|---|---|---|
| 3,037,954 | 6/1962 | Gessler et al. | 260/29.8 |
| 3,806,558 | 4/1974 | Fisher | 260/897 |
| 4,130,535 | 12/1978 | Coran et al. | 260/33.6 |
| 4,311,628 | 1/1982 | Abdou-Sabet et al. | 260/33.6 |

*Primary Examiner*—Jacob Ziegler
*Attorney, Agent, or Firm*—Gordon B. Seward; Larry R. Swaney

[57] ABSTRACT

A process is described for the preparation of thermoplastic elastomers comprising a blend of plastic and cured rubber by dynamic vulcanization wherein the blend is subjected to high shear.

16 Claims, No Drawings

PROCESS FOR THE PREPARATION OF THERMOPLASTIC ELASTOMERS

This application relates to dynamic vulcanization processes for the preparation of thermoplastic elastomers comprising a blend of plastic and cured rubber, and to products prepared by said processes.

BACKGROUND OF THE INVENTION

Dynamic vulcanization is a process whereby a blend of plastic, rubber and rubber curative is masticated while curing the rubber. The term "dynamic" indicates the mixture is subjected to shear forces during the vulcanization step as contrasted with "static" vulcanization wherein the vulcanizable composition is immobile (in fixed relative space) during the vulcanization step. One advantage of dynamic vulcanization is that elastoplastic (thermoplastic elastomeric) compositions may be obtained when the blend contains the proper proportions of plastic and rubber. Examples of dynamic vulcanization are described in U.S. Pat. Nos. 3,037,954; 3,806,558; 4,104,210; 4,116,914; 4,130,535; 4,141,863; 4,141,878; 4,173,556; 4,207,404; 4,271,049 4,287,324; 4,288,570; 4,299,931; 4,311,628 and 4,338,413.

Dynamic vulcanization processes are not entirely satisfactory for making soft compositions because as the rubber level rises the resulting compositions become less fabricable, for example, the compositions give poor extrudates and, sometimes, cannot be extruded at all. Accordingly, there is a need for processes for preparing soft, extrusion-fabricable, thermoplastic elastomeric compositions.

SUMMARY OF THE INVENTION

It has been discovered that an improved thermoplastic elastomer composition comprising a blend of plastic and cured rubber results, by masticating during vulcanization a composition comprising a blend of plastic and rubber at a shear rate of at least 2000 sec$^{-1}$. Preferably, the blend is subjected during vulcanization to a shear rate of about 2500 to 7500 sec$^{-1}$. The thermoplastic elastomeric composition so produced exhibits superior tensile properties including higher strength and greater elongation and (depending upon the amount of rubber) also exhibits better fabricability, i.e., its draw-down ratio is higher indicating better extrudability. Moreover, extrudable compositions containing high proportions of rubber can be produced by the process of the invention, whereas, identical blends dynamically vulcanized at low shear rates (for example, the level of shear obtained in Banbury mixers) are non-extrudable compositions.

The process of the invention is applicable to any blend of plastic, rubber and rubber curative. Of course, it is understood that the plastic and rubber must be compatible or compatibilizable by a compatibilizing agent such as, a block copolymer or graft polymer. Any rubber curative suitable for dynamic vulcanization and suitable for the particular rubber is satisfactory for the process of this invention. For examples, of suitable plastics, rubbers, and rubber curatives refer to the patents mentioned under the Background of the Invention, the disclosures of which are incorporated herein by reference.

It is further understood that compositions suitable for the practice of the invention contain ingredients other than rubber and plastic, for example, particulate fillers, carbon black, clay, silica, plasticizers, extender oils, antidegradants, stabilizers, and components normally compounded in blends of plastic and rubber. The process is suitable for compositions having a melt viscosity of 10 to 200 pascal seconds and is especially suitable for compositions having a melt viscosity of 10 to 100 pascal seconds. The melt viscosity is the viscosity at the shear rate of 2000 sec$^{-1}$ to 10,000 sec$^{-1}$ of a homogeneous blend comprising rubber, plastic and all other compounding ingredients, with the plastic in a molten condition, typically at about 170°–230° C. The melt viscosity of a blend can be reduced by adding extender oil or plasticizer or both.

The process of the invention is suitable for compositions comprising a blend of plastic and rubber which comprises 50 weight percent or less of plastic. The relative proportions of plastic and rubber cannot be clearly delineated because the limits vary due to the nature and type of plastic and rubber involved and the type and amounts of other ingredients, such as, extender oil, plasticizer and particulate fillers. Generally, the process of the invention is especially advantageous for compositions comprising a blend of 60–85 parts by weight of rubber and correspondingly, 40–15 parts by weight of plastic. The process is especially advantageous for the preparation of extrudable blends comprising 70–80 parts by weight of EPDM rubber and correspondingly, 30–20 parts by weight of polypropylene. A more preferred blend contains 1–1.5 parts by weight of extender oil per part by weight of EPDM rubber.

One advantage of the process of the invention is that vulcanization is essentially complete in two minutes or less. At shear rates of 2500 sec$^{-1}$ or more, vulcanization is complete within 20–60 seconds. Since out-put increases with decreasing residence times, short residence time in the mixer results in greater production efficiency. Shorter residence times also means less degradation of thermally unstable plastics and rubbers.

Any mixer capable of generating a shear rate of 2000 sec$^{-1}$ or higher is suitable for carrying out the process of the invention. Generally, this requires a high speed internal mixer having a narrow clearance between the tips of the kneading elements and the wall. Shear rate is the velocity gradient in the space between the tip and the wall. Depending upon the clearance between the tip and the wall, rotation of the kneading elements from about 100 to 500 revolutions per minute (rpm) is generally adequate to develop a sufficient shear rate. Depending upon the number of tips on a given kneading element and the rate of rotation, the number of times the composition is kneaded by each element is about 1 to 30 times per second, preferably about 5 to 30 times per second, and more preferably about 10 to 30 times per second. This means that material typically is kneaded from about 200 to 1800 times during vulcanization. For example, in a typical process with a rotor with three tips rotating at 400 rpm in a mixer having a residence time of 30 seconds, the material will be kneaded 600 times.

A mixer satisfactory for carrying out the process of the invention is a high shear mixing extruder produced by Werner & Pfleiderer, Germany. The Werner & Pfleiderer (WP) extruder is a twin-shaft screw extruder in which two intermeshing screws rotate in the same direction. Details of such extruders are described in U.S. Pat. Nos. 3,963,679 and 4,250,292; and German Pat. Nos. 2,302,546; 2,473,764 and 2,549,372, the disclosures of which are incorporated herein by reference. Screw diameters vary from 53 mm to 300 mm; barrel lengths vary but generally the maximum barrel length is the length necessary to maintain a length over diameter ratio of 42. The shaft screws of these extruders normally are made-up of alternating series of conveying sections and kneading sections. The conveying sections cause material to move forward from each kneading section of the extruder. Typically there are about an equal number of conveying and kneading sections fairly evenly distributed along the length of the barrel. Kneading elements containing one, two, three or four tips are suitable, however, kneading elements 5-30 mm wide having three tips are preferred. At recommended screw speeds of 100-600 rpm and radial clearance of 0.1 to 0.4 mm, these mixing extruders provide shear rates of at least 2000 sec$^{-1}$ to 7500 sec$^{-1}$ or more. The net mixing power expended in the process of the invention including homogenization and dynamic vulcanization is usually about 100-500 watt hours per kilogram of product produced; with about 300-400 watt hours per kilogram being typical.

DESCRIPTION OF THE PREFERRED EMBODIMENTS

The process of the invention is illustrated by the use of W&P twin screw extruders, models ZSK-53 or ZSK-83. Unless specified otherwise, all of the plastic, rubber and other compounding ingredients except cure activator are fed into the entry port of the extruder. In the first third of the extruder, the composition is masticated to melt the plastic and to form an essentially homogeneous blend. Cure activator (vulcanization accelerator) is added through another entry port located about one-third of the length of the barrel downstream from the initial entry port. The last two-thirds of the extruder (from the cure activator entry port to the outlet of the extruder) is regarded as the dynamic vulcanization zone. A vent operated under reduced pressure is located near the outlet to remove any volatile by-products. Sometimes, additional extender oil or plasticizer and colorants are added at another entry port located about the middle of the vulcanization zone.

The residence time within the vulcanization zone is the time a given quantity of material is within the aforesaid vulcanization zone. Since the extruders are typically operated under a starved condition, usually about 60 to 80 percent full, residence time is essentially directly proportional to feed rate. Thus, residence time in the vulcanization zone is calculated by multiplying the total volume of the dynamic vulcanization zone times the fill factor divided by the volume flow rate. Shear rate is calculated by dividing the product of the circumference of the circle generated by the screw tip times the revolutions of the screw per second by the tip clearance. In other words, shear rate is the tip velocity divided by the tip clearance.

Polypropylene/EPDM rubber blends are used to illustrate the invention. The blends comprise (all parts by weight) 100 parts by EPDM rubber (4.5 wt.% ethylidene norbornene), 37 parts of kaolin clay, 130 parts of extender oil, 5 parts of titanium dioxide, 5 parts of wax, 2 parts of zinc oxide, 10 parts of methylol phenolic curing resin and varying amounts of polypropylene, PP, (Profax 6723) as indicated in Table 1. In addition, 1.68 parts of stannous chloride cure activator is added to activate the vulcanization reaction. The compositions after homogenation before addition of cure activator have a melt viscosity of about 60 to 80 pascal seconds at about 200° C. and at a shear rate of about 2000 sec$^{-1}$. After vulcanization, the compositions have a melt viscosity of about 80 to 100 pascal seconds at the same temperature and shear rate.

The aforesaid blend compositions are fed at 83 to 116 Kg per hour depending upon the amount of polypropylene added to a W&P ZSK-53 Extruder having a screw tip clearance of about 0.2 mm. The screw speed is 350 rpm. The temperature along the vulcanization zone is 180° to 230° C. The shear rate is 4850 sec$^{-1}$ between the screw tip and the barrel wall. The residence time in the dynamic vulcanization zone varies from 32 to 42 seconds. The thermoplastic elastomeric composition exiting from the extruder is pelletized and the pellets are injection molded to form plaques from which properties are measured. Compositions containing identical components are prepared in a 1-A Banbury mixer at about 197° C. dump temperature. Residence times of about 4-4.5 minutes after addition of the curative system are required to complete vulcanization. The rotor speed is about 110 rpm and the shear rate is about 360 sec$^{-1}$. Except for the Banbury run of Example 1 which could not be extruded, the product is pelletized and the pellets are injection molded to form plaques from which properties are measured. Measurements in parenthesis of Example 1, are measured from plaques prepared by compression molding. Rod draw-down ratio is the ratio of the velocity a rod shaped extrudate issuing from a 4.7 mm diameter orifice at 190° C. and the velocity of the extrudate at break when subjected to a constant increase in velocity by increasing the rate of revolution of a take-up drum. The data is summarized in Table 1.

TABLE 1

| | Example No. | | | | | | | | | | | |
|---|---|---|---|---|---|---|---|---|---|---|---|---|
| | 1 | | 2 | | 3 | | 4 | | 5 | | 6 | |
| Mixer | Banbury | ZSK-53 | Banbury | ZSK-53 | Banbury | ZSK-53 | Banbury | ZSK-53 | Banbury | ZSK-53 | Banbury | ZSK-53 |
| Rate Kg/Hr. | 74 | 83 | 74 | 85 | 74 | 90 | 74 | 99 | 74 | 116 | 74 | 102 |
| Polypropylene, Phr. | 32.5 | 30 | 38 | 40 | 58.5 | 58.5 | 88 | 88 | 152 | 152 | 223 | 223 |
| Rubber/PP Ratio | 75.5/24.5 | 77/23 | 72.5/27.5 | 71.4/28.6 | 63/37 | 63/37 | 53/47 | 53/47 | 40/60 | 40/60 | 31/69 | 31/69 |
| Residence Time, Sec | 240 | 42 | 240 | 41 | 240 | 39 | 240 | 37 | 240 | 32 | 240 | 36 |
| Properties | | | | | | | | | | | | |
| TS, MPa | — (4.9) | 5.0 (5.7) | 3.8 | 7.2 | 8.8 | 9.7 | 11.2 | 12.8 | 15.2 | 17.8 | 18.3 | 20.9 |
| M$_{100}$, MPa | — (2.1) | 2.8 (3.0) | 2.1 | 2.8 | 3.8 | 4.2 | 4.6 | 5.2 | 8.3 | 7.1 | 8.4 | 9.0 |
| Elong., % | — (270) | 260 (330) | 240 | 390 | 380 | 450 | 460 | 510 | 520 | 570 | 550 | 570 |
| Tension Set, % | — (3) | 9 (5) | 5 | 9 | 10 | 13 | 13 | 17 | 23 | 28 | 31 | 40 |
| Hardness | — | 63A | 63A | 62A | 71A | 74A | 81A | 82A | 89A | 91A | 41D | 40D |

TABLE 1-continued

| | Example No. | | | | | | | | | | | |
|---|---|---|---|---|---|---|---|---|---|---|---|---|
| | 1 | | 2 | | 3 | | 4 | | 5 | | 6 | |
| Mixer | Banbury | ZSK-53 | Banbury | ZSK-53 | Banbury | ZSK-53 | Banbury | ZSK-53 | Banbury | ZSK-53 | Banbury | ZSK-53 |
| TSB, MPa | — (18) (57A) | 18 (25) (57A) | 13 | 35 | 42 | 53 | 63 | 78 | 94 | 119 | 119 | 140 |
| Rod Drawn-Down | — (0) | 1.6 (1.6) | 1.1 | 1.9 | 2.7 | 3.9 | 4.0 | 5.3 | 7.8 | 8.0 | >10 | >10 |

The data indicate that the thermoplastic elastomeric compositions produced under high shear exhibit superior tensile properties over the entire range of plastic/rubber ratio. The draw-down data indicate that the process of the invention involving high shear dynamic vulcanization improves the fabricability (extrudability) of compositions containing higher proportions of rubber (Example 1-4). The compositions of Example 1 prepared under low shear conditions in the Banbury mixer was not fabricable by extrusion, but it will form a sheet on a mill and can be compression molded. Comparison of the compression molded properties of Example 1 show that the process of the invention results not only in a fabricable product but also superior tensile properties.

The process of the invention using a ZSK-83 WP extruder mixer at a shear rate of about 5000 sec$^{-1}$ gives extrudable compositions within the range of 55-65 Shore A hardness, whereas, a process using a 3D Banbury mixer at a shear rate of about 360 sec$^{-1}$ and the same ingredients and proportions of ingredients gives non-extrudable compositions.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. In a process for preparing thermoplastic elastomer composition comprising a blend of plastic and cured rubber by dynamic vulcanization, the improvement comprising masticating during dynamic vulcanization a composition comprising a blend of polypropylene and ethylene-propylene diene monomer rubber at a shear rate of at least 2000 sec$^{-1}$.

2. The process of claim 1 in which the melt viscosity of the composition is 10 to 200 pascal seconds.

3. The process of claim 2 in which the shear rate is about 2500 to 7500 sec$^{-1}$.

4. The process of claim 3 in which the composition comprises 50 weight percent or less of polypropylene and has a melt viscosity of 10 to 100 pascal seconds.

5. The process of claim 4 in which the composition comprises a blend of 60-85 parts by weight of rubber and correspondingly, 40-15 parts by weight of polypropylene.

6. The process of claim 5 in which vulcanization is essentially complete in 20-60 seconds.

7. The process of claim 6 in which the rubber is cured to the extent that no more than 5 weight percent of the rubber is soluble in a rubber solvent.

8. The process of claim 7 in which the rubber curative is a phenolic curative comprising phenolic resin and cure activator.

9. The process of claim 8 in which the blend is masticated by the use of a twin-shaft screw extruder in which two intermeshing screws rotate in the same direction.

10. The process of claim 9 in which the composition comprises a blend of 70-80 parts by weight of rubber and, correspondingly, 30-20 parts by weight of polypropylene.

11. The process of claim 10 in which the composition contains 1-1.5 parts of extender oil per part of rubber.

12. A product prepared by the process of claim 1.

13. The product of claim 12 prepared by the process of claim 7.

14. The product of claim 13 prepared by the process of claim 8.

15. The product of claim 14 prepared by the process of claim 9.

16. The product of claim 15 in which the composition comprises a blend of 70-80 parts by weight of rubber and, correspondingly, 30-20 parts by weight of polypropylene.

* * * * *